July 17, 1923.
R. J. STOKES
BRAKE BLOCK
Filed July 7, 1921
1,462,391
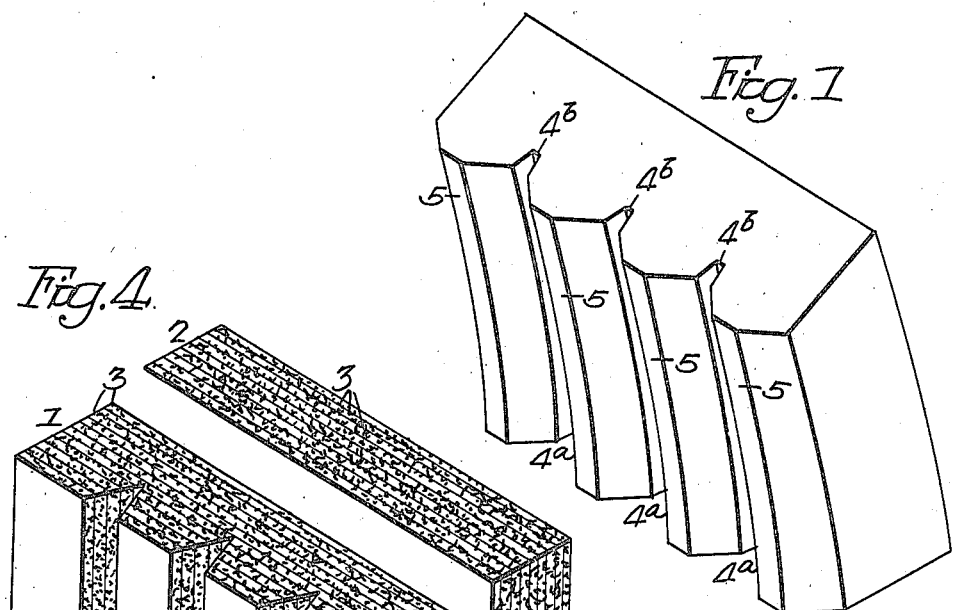
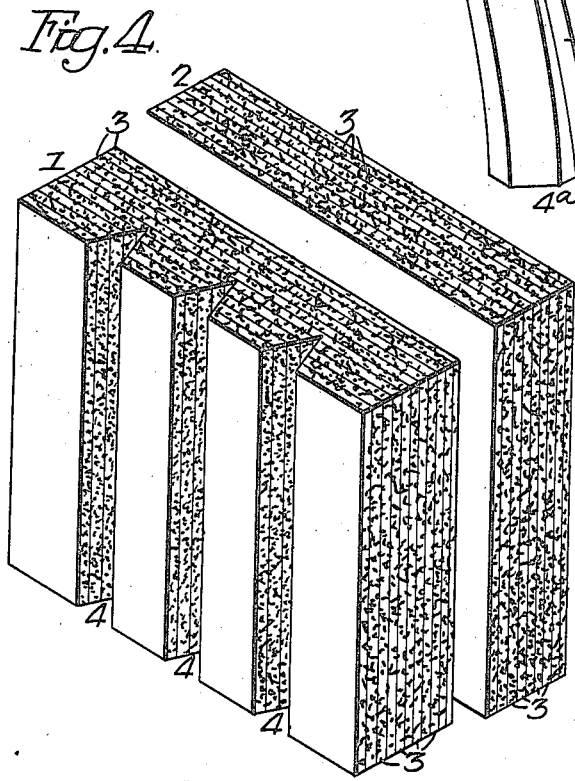
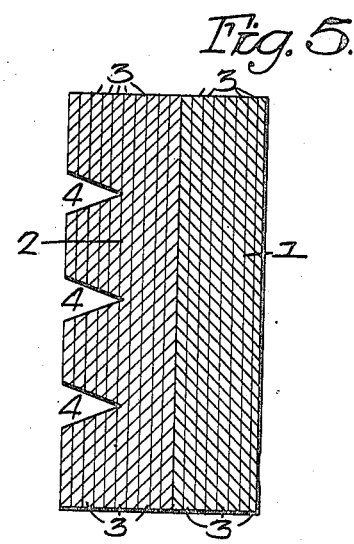
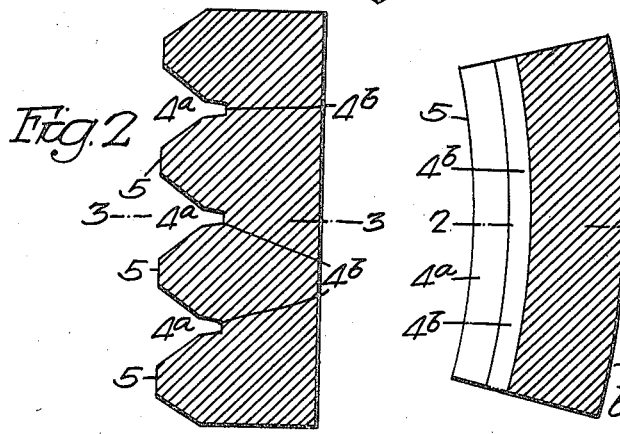
Inventor—
Robert J. Stokes.
by his Attorneys Patented July 17, 1923.

1,462,391

UNITED STATES PATENT OFFICE.

ROBERT J. STOKES, OF TRENTON, NEW JERSEY, ASSIGNOR TO THERMOID RUBBER COMPANY, OF HAMILTON TOWNSHIP, NEW JERSEY, A CORPORATION OF NEW JERSEY.

BRAKE BLOCK.

Application filed July 7, 1921. Serial No. 482,991.

*To all whom it may concern:*

Be it known that I, ROBERT J. STOKES, a citizen of the United States, residing in Trenton, Mercer County, New Jersey, have invented certain Improvements in Brake Blocks, of which the following is a specification.

One object of my invention is to make a brake block of a composition of asbestos fibre, short sections of wire and a binder capable of being vulcanized so that the brake block, when moulded under heavy pressure, can be made to assume a shape to correspond with the shape of the drum with which it is to come into frictional contact.

A further object of the invention is to make a brake block so that the ends of the layers of the fabric of which it is made will be presented at the wearing surface of the block.

In the accompanying drawings:

Fig. 1 is a perspective view of my improved brake block;

Fig. 2 is a transverse sectional view on the line 2—2, Fig. 3;

Fig. 3 is a sectional view on the line 3—3, Fig. 2;

Fig. 4 is a perspective view of the two blocks of fabric prior to being assembled, shaped and vulcanized; and Fig. 5 is a sectional view of the two blocks shown in Fig. 4, secured together prior to being vulcanized.

1 and 2 are blocks made up of a series of layers 3 of asbestos fabric woven in strips with a given amount of short sections of fine metallic wire and impregnated, or coated, with rubber, or other material capable of being vulcanized. The block 1 is cut at 4 to form grooves, which are V-shaped, in the present instance, so as to resemble, somewhat, the finished grooves in the block, but it will be understood that the shape of the grooves will depend materially upon the shape of the ribs of the brake drum with which the block engages.

The two blocks 1 and 2 are secured together by a vulcanizable cement, as shown in Fig. 4, and then the combined block, Fig. 4, is placed in a suitable mold under heavy hydraulic pressure and vulcanized, after which the block is removed and will be curved to correspond to the curve of the brake drum, as indicated in Fig. 1, and will have the grooves 4ª formed therein of the particular shape shown in Fig. 2, which will correspond with the V-shaped ribs of the drum. Each groove has an extension 4ᵇ for clearance, and the ribs between the grooves are flat, as at 5, so as to provide clearance between the face of the block and the bottom of the space between the ribs of the drum.

It will be noticed that the block 2 is slightly larger in size than the block 1 so that when the combined block, Fig. 4, is placed under pressure and molded it will produce a block of greater width at the back than at the front, as clearly shown in Figs. 1 and 3.

By the above method, a very substantial brake block can be made, which can be molded accurately to the curve of the drum against which it is to act and in which the edges of the woven fabric will be exposed at the walls of the grooves so that when the block is applied to the drum the edges of the fabric will bear against the ribs of the drum and will firmly hold the drum. By designing the block so that the ends of the fibres are at the wearing surface, the life of the block is materially lengthened.

I claim:

1. A curved bearing block having a series of tapered grooves therein, said block consisting of sheets of asbestos fabric and a vulcanizable adhesive, the fabric being discontinued at the grooves.

2. A curved bearing block consisting of layers of asbestos fabric and a vulcanizable binder, the face of the block having tapered, parallel grooves, the fabric, at and near the face of the block, being cut to expose the ends thereof at the grooves.

3. The process hereinbefore described of making a brake block, said process consisting in assembling sheets of asbestos fabric that have been treated with a vulcanizable adhesive, cutting a series of parallel grooves in one face of the block formed by the fabric so as to expose the edges of the layers of fabric at the grooves, then subjecting the block to heavy pressure to mold the block into a curved shape, and, at the same time, vulcanizing the block.

ROBERT J. STOKES.